US005581929A

United States Patent [19]

Molloy

[11] Patent Number: 5,581,929
[45] Date of Patent: Dec. 10, 1996

[54] FISHING NETS

[75] Inventor: James Molloy, Banbridge, Great Britain

[73] Assignee: JCJ Limited, Larne, Great Britain

[21] Appl. No.: 406,994
[22] PCT Filed: Sep. 29, 1992
[86] PCT No.: PCT/GB92/01784
    § 371 Date: Apr. 21, 1995
    § 102(e) Date: Apr. 21, 1995
[87] PCT Pub. No.: WO94/07362
    PCT Pub. Date: Apr. 14, 1994
[51] Int. Cl.⁶ ................................................. A01K 77/00
[52] U.S. Cl. ................................................. 43/12
[58] Field of Search ................................. 43/7, 11, 12

[56] References Cited

U.S. PATENT DOCUMENTS

| 440,568 | 11/1890 | Hebard | 43/12 |
| 1,921,596 | 8/1933 | Walter | 43/12 |
| 2,115,082 | 4/1938 | Phillips | 43/12 |
| 2,738,608 | 3/1956 | Buzzini | 43/12 |
| 4,574,513 | 3/1986 | Wearing | |
| 4,815,227 | 3/1989 | Flanders | 43/7 |

FOREIGN PATENT DOCUMENTS

| 1457592 | 11/1966 | France. | |
| 2658699 | 8/1991 | France. | |
| 0598315 | 3/1948 | United Kingdom. | |
| 0625819 | 7/1949 | United Kingdom | 43/12 |
| 1521634 | 8/1978 | United Kingdom | 43/12 |
| 8501859 | 5/1985 | WIPO. | |

Primary Examiner—Joseph J. Hail, III
Assistant Examiner—James Miner
Attorney, Agent, or Firm—Edwin E. Greigg; Ronald E. Greigg

[57] ABSTRACT

A fishing net comprises a shaft handle, a net support and a bag net. The net support projects from the handle in an extended position. The net support has two diverging arms connected together at their outer ends by a first flexible element. The bag net is carried by the net support around an open mouth of said bag net. The handle is tubular and the divergent arms of the net support are movable lengthwise of the handle to a retracted position substantially parallel to the axis of the handle with the net being accommodated inside the handle.

11 Claims, 4 Drawing Sheets

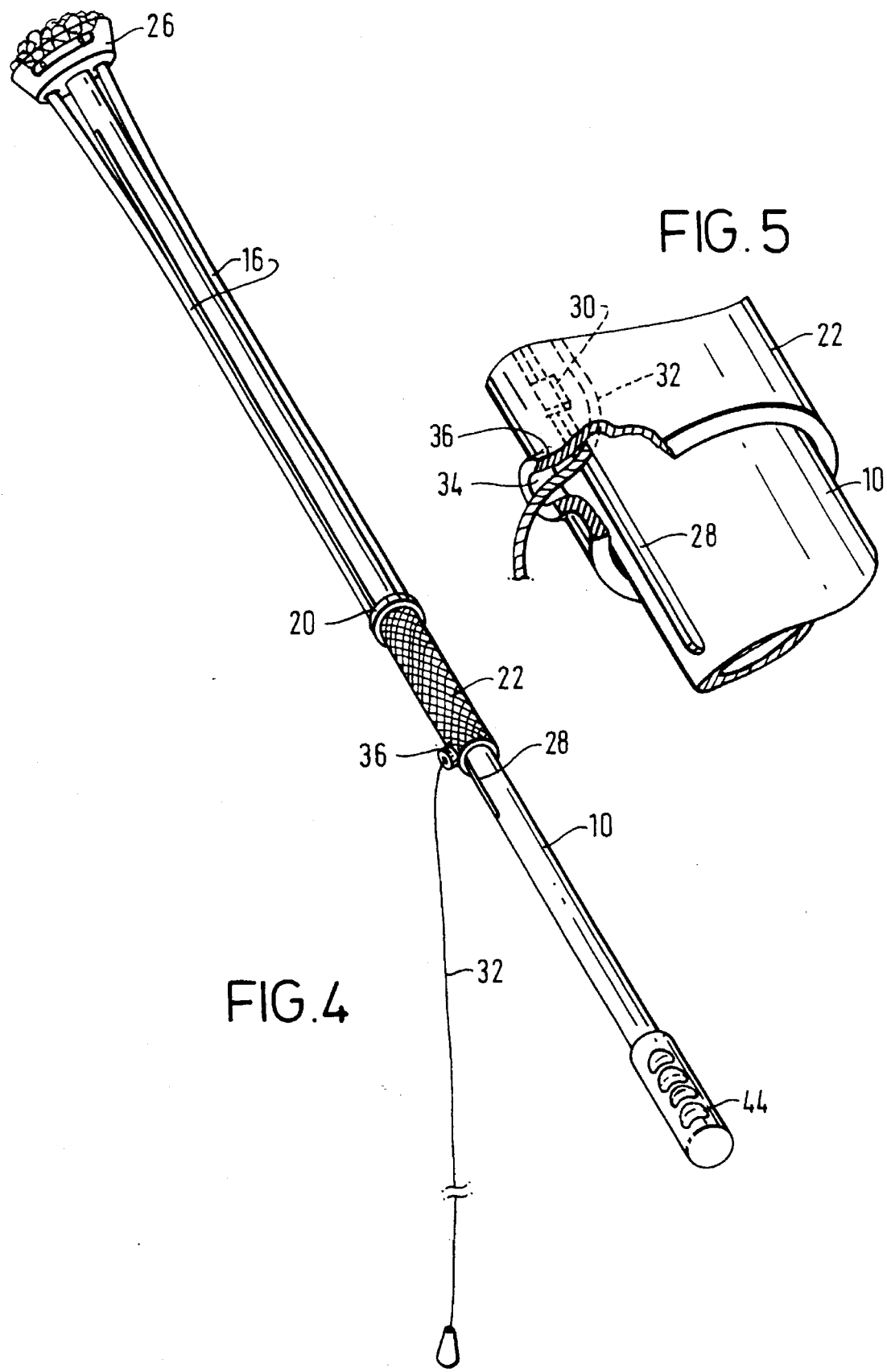

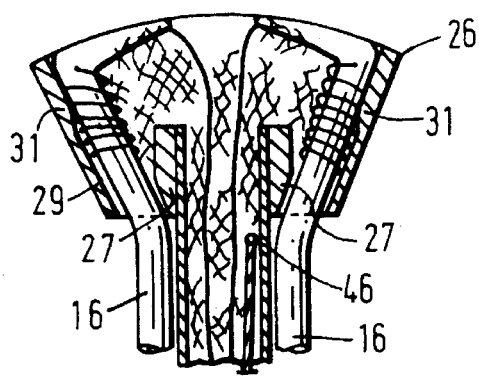
FIG. 6A
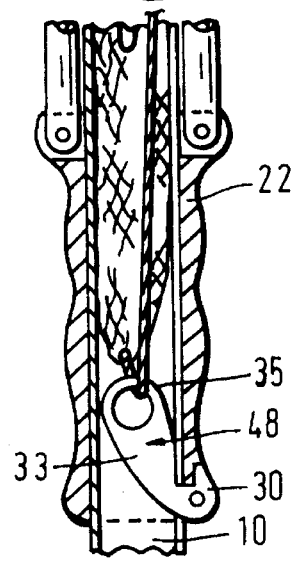
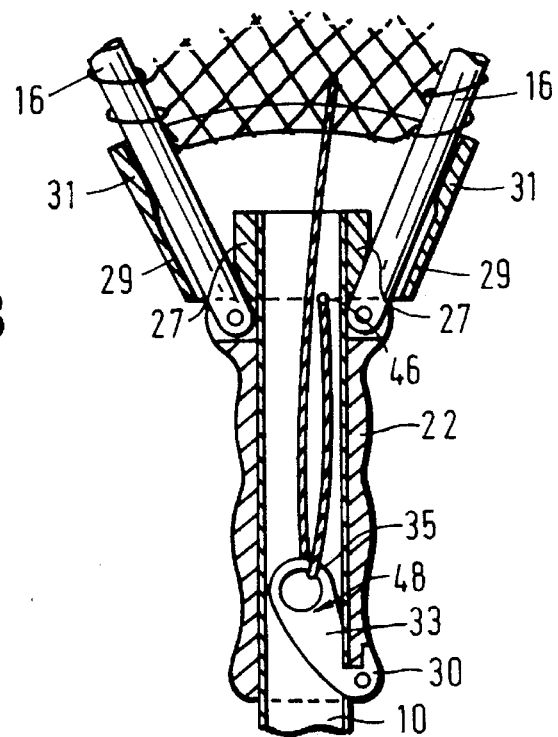
FIG. 6B

FISHING NETS

This invention relates to a fishing net for use in landing fish.

Fish landing nets for individuals have been provided heretofore, the majority, if not all, of which in their collapsed or retracted carrying state have their bay net or part thereof unprotected, for example in a collapsed loose state at one end of a shaft handle or wound around a shaft handle, and therefore available to be caught or snagged on vegetation, i.e. branches of a bush or tree, as a fisherman is carrying the net to or from a fishing stance or between fishing stances. This is disadvantageous and an object of the present invention is to obviate or mitigate this disadvantage.

Accordingly, the present invention is a fishing net comprising a tubular shaft handle, a net support projecting therefrom in an extended position, the support having two diverging arms connected together by a first flexible element at their outer ends with the inner ends of the arms being pivotally connected to an annular union provided at an outer end of a collar slidable along the handle, a bag net carried by the support around its open mouth, the arms of the net support being movable lengthwise and externally of the handle to a retracted position substantially parallel to the axis of the handle with the net to be accommodated inside the handle, and a second flexible element being secured to the net and threaded internally into the handle to enable the net to be pulled using the second element into the handle on retraction of the support.

Preferably, the arms are slidably engaged in respective divergent passages of a mounting provided at an outer end of the handle. The outer ends of the arms are desirably inwardly bent. The mounting has desirably an inner wall whose inner periphery is of a complementary fit for the handle and an outer wall to define with the outer periphery of the inner wall the divergent passages, the inner periphery of the outer end portions of the outer wall having inward ramps to influence the outer end portions of the arms inwardly, when retracted, for their outer ends to substantially abut each other.

The handle has desirably a radial slot in which a slide, integral with the collar, tracks to prevent rotation between the collar and the handle.

The other end of the second flexible element is desirably threaded through the mounting and the handle to exit therefrom through the slot and a hole in the collar for manually pulling the net into the handle with the arms in a partially or fully retracted position.

Alternatively, the other end of the second flexible element is beneficially secured to the handle adjacent to its outer end, the second element having first passed around a guide provided on the inside portion of the slide, the guide serving to pull the net into the handle as the collar is moved down the handle to a retracted position. The guide may be an apertured extension of the slide providing a limb around which the second element is passed, or may be a low-friction rotatable roller mounted on an extension of the guide.

Preferably also, the collar has a bar catch and the mounting is provided with a hook to engage the catch whereby when the net support is fully extended the hook and catch are engaged. The hook is desirably of resilient material to be capable of being depressed to allow it to be released from the catch for retraction of the arms.

Preferably further, the inner end of the handle is provided with a hand grip.

An embodiment of the present invention will now be described, by way of example, with reference to the accompanying drawings, in which:

FIG. 4 is a perspective view of the fishing net with a fully retracted net support and net;

FIG. 5 is a perspective view of a detail of the handle and a collar; and

FIGS. 6A and 6B are side views of part of the fishing net showing a modified arrangement for pulling the net into the handle in retracted and extended positions respectively.

Figure 1:
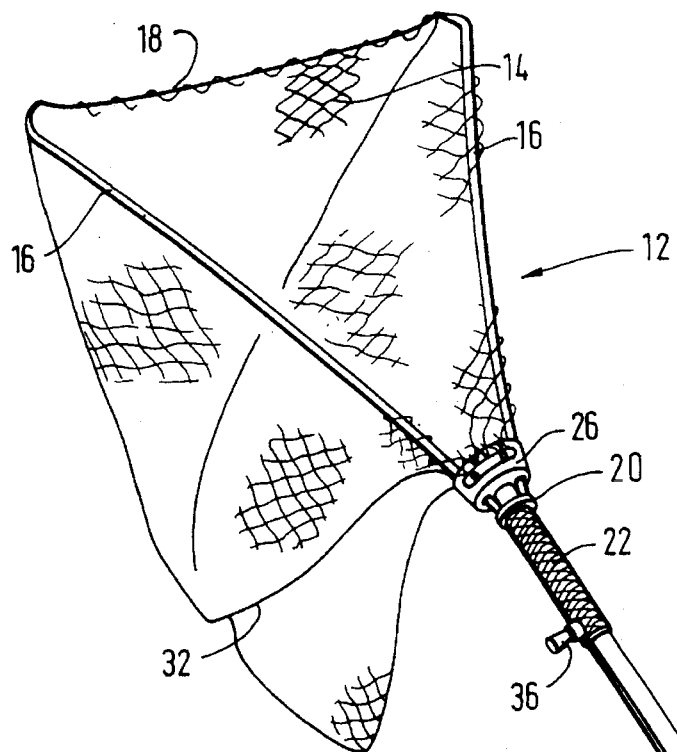
FIG. 1 is a perspective view from above of a fishing net according to the present invention, the net being shown in an extended position.
Figure 2:
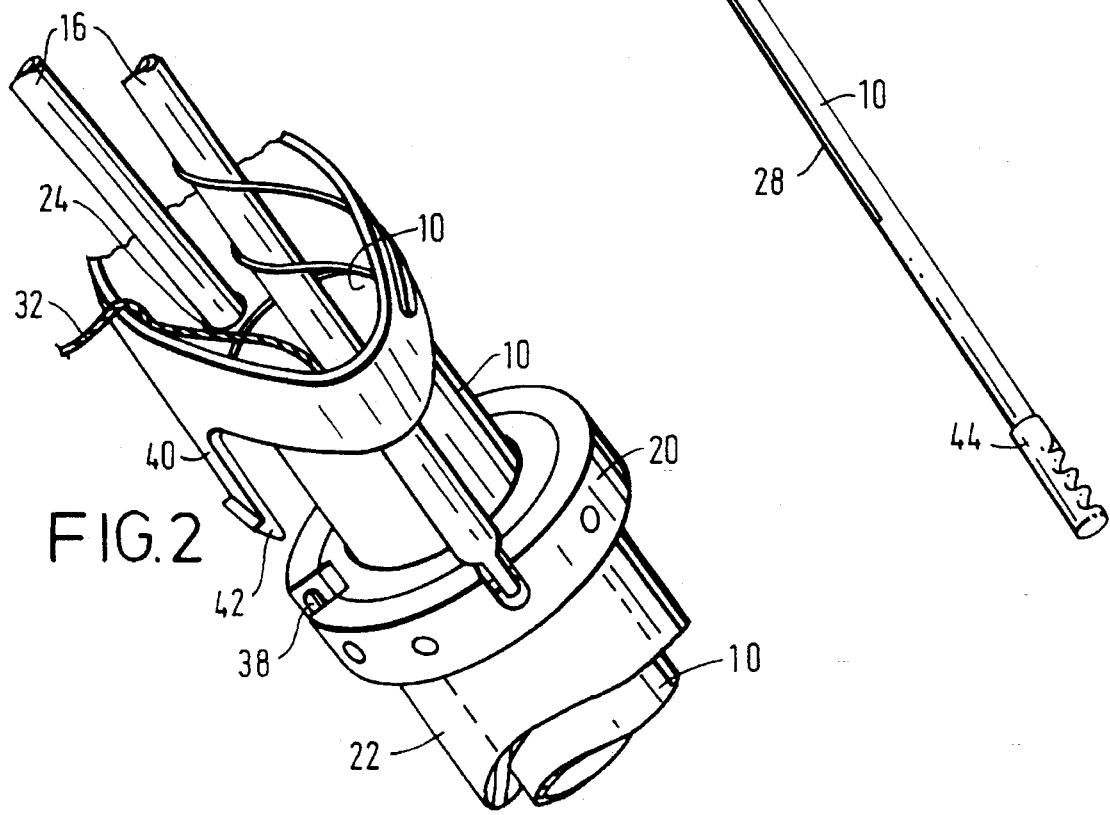
FIG. 2 is a perspective view of a detail at the outer end of a handle with a catch and a hook components about to be engaged.

Referring to the drawings, a fishing net comprises a tubular shaft handle 10, a net support 12 and a bag net 14. The support 12 projects from the handle 10 in an extended position. The support 12 has two diverging arms 16 connected together by a first flexible element 18 at their outer ends which are inwardly bent as shown. The bag net 14 is carried by the support 12 around its open mouth. The arms 16 of the net support 12 are movable lengthwise of the handle 10 to a retracted position substantially parallel to the axis of the handle 10 with the net 14 being accommodated inside the handle 10 as hereinafter described.

The inner ends of the arms 16 are pivotally connected to an annular union 20 provided at an outer end of a collar 22 slidable along the handle 10. The arms 16 are slidably engaged in respective divergent passages 24 of a mounting 26 provided at an outer end of the handle 10. The handle 10 has a radial slot 28 in which a slide 30, integral with the collar 22, tracks to prevent rotation between the collar 22 and the handle 10. The mounting 26 has an inner wall 27 whose inner periphery is of a complementary fit for the handle 10, and an outer wall 29 to define with the outer periphery of the inner wall 27 the divergent passages 24, and the outer end portions of the outer wall 29 for each passage 24 having inward ramps 31 to influence the outer end portions of the arms inwardly, when retracted, for their outer ends to substantially abut each other.

A second flexible element 32 is secured to inside of the net 14 and threaded through the mounting 26 and the handle 10 to exit through a hole 34 in a boss 36 in the collar 22.

The collar 22 has a bar catch 38 and the mounting 26 is provided with a member 40 having a hook 42 to engage the catch 38 whereby when the net support 12 is fully extended the hook 42 and the catch 38 are engaged. The member 40 is of resilient material to be capable of being depressed to allow the hook 42 to be released from the catch 38 for retraction of the arms 16.

The inner end of the handle 10 is provided with a hand grip 44.

Figure 3:
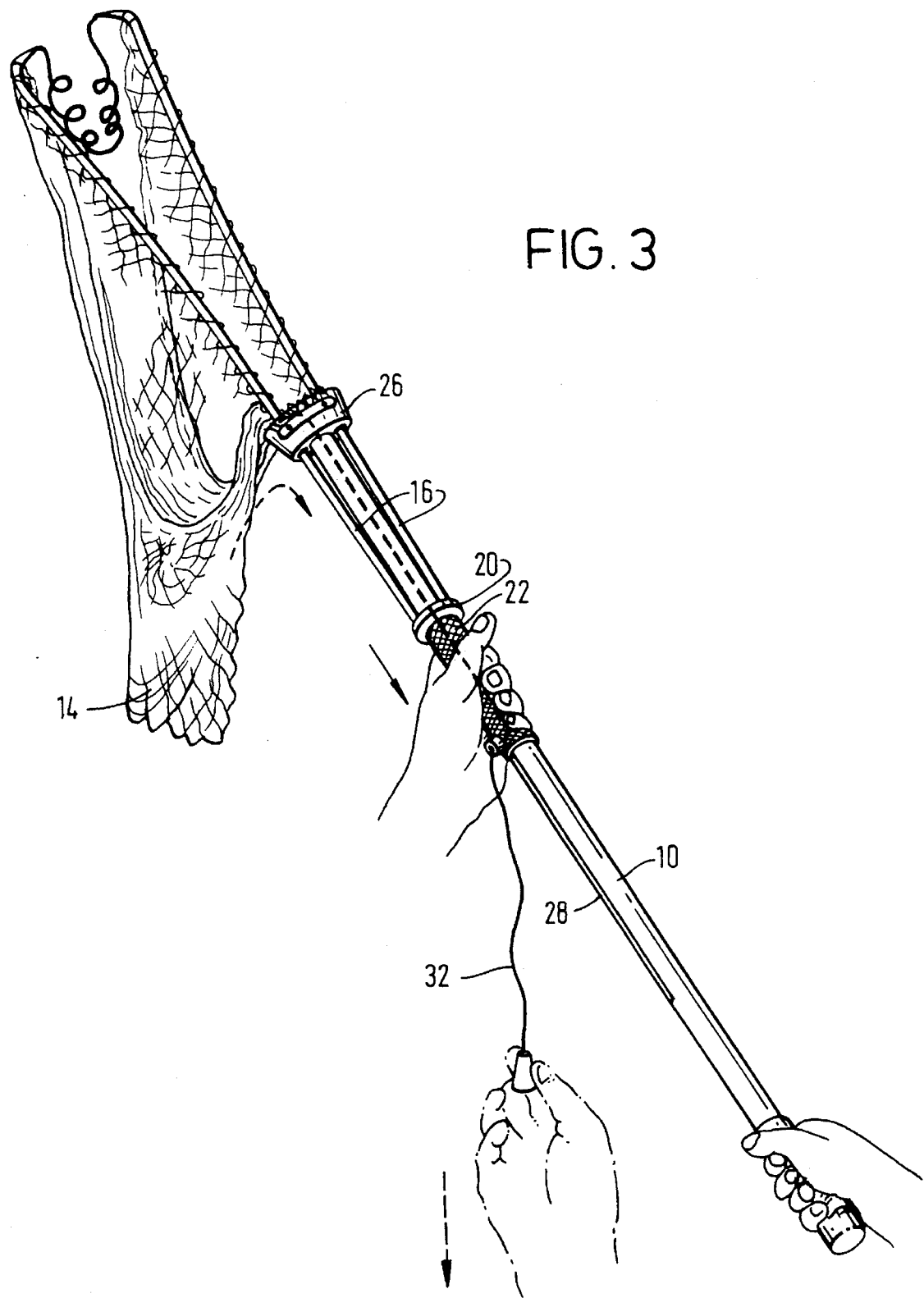
FIG. 3 is a perspective view of the fishing net with a partially retracted net support and net.

The fishing net as described above is advantageous over existing nets in that the bag net 14 is wholly withdrawn into the handle 10 and is therefore not available to be caught or snagged on branches, thorns or other vegetation as an angler walks through or brushes passed overgrown vegetation. For use, the collar 22 is pushed outwardly until the catch 38 rides over a ramp on the hook and allows the hook to engage thereover. To retract the net 14, the hook 42 is disengaged from the catch 38 and the collar pulled down the handle as shown in FIG. 3. The pulling down movement is stopped halfway and the element 32 is pulled to withdraw part of the net 14 into the handle 10. The movement is continued and the element 32 is then pulled to withdraw fully the net 14 into the handle 10.

In a modification as shown in FIGS. 6A and 6B, the withdrawing of the net 14 into the handle is accomplished automatically. The other end of the second flexible element 32 is anchored to the handle 10 adjacent to its outer end at 46. The second element 32 extends between the net 14 and the anchorage 46 around a guide 48 provided on the inside portion of the slide 30. The guide 48 is an apertured extension 33 of the slide 30 providing a limb 35 around which the second element is passed. Alternatively, the guide may be a low-friction rotatable roller (not shown) mounted on an extension of the guide.

Variations and modifications can be made without departing from the scope of the invention as above described and claimed hereinafter.

I claim:

1. A fishing net comprising:

a tubular shaft handle, a net support projectable from said tubular shaft handle in an extended position, the net support having two diverging arms connected together at their outer ends by a first flexible element with their inner ends being pivotally connected to an annular union provided at an outer end of a collar which is slidable along the tubular shaft handle, a bag net having an open mouth and being carried by the net support around its open mouth, the diverging arms of the net support being movable lengthwise and externally of the tubular shaft handle to a retracted position with the divergent arms substantially parallel to an axis of the tubular shaft handle and in which position the net is accommodated inside the handle, and a second flexible element being secured to the net and threaded internally into the tubular shaft handle to enable the net to be pulled into the handle by the use of the second flexible element upon retraction of the net support.

2. A fishing net according to claim 1, wherein the diverging arms are slidably engaged in respective divergent passages of a mounting means provided at an outer end of the tubular shaft handle.

3. A fishing net according to claim 2, wherein the collar has a bar catch and the mounting means is provided with a hook to engage the catch whereby when the net support is fully extended the hood and catch are engaged.

4. A fishing net according to claim 3, wherein the hook is of resilient material which is capable of being depressed to allow the hook to be released from the catch for retraction of the arms.

5. A fishing net according to claim 2, wherein the tubular shaft handle has a radial slot in which a slide integral with the collar is movable to prevent rotation between the collar and the tubular shaft handle.

6. A fishing net according to claim 5, wherein another end of the second flexible element is threaded through the mounting means and the tubular shaft handle to exit from said tubular shaft handle through the slot and a hole is provided in the collar for manually pulling the net into the tubular shaft handle with the divergent arms in a partially or fully retracted position.

7. A fishing net according to claim 5, wherein another end of the second flexible element is secured to the tubular shaft handle adjacent the outer end of said tubular shaft handle, the second element having first passed around a guide provided on the inside portion of the slide, the guide serving to pull the net into the tubular shaft handle as the collar is moved along the handle to a retracted position.

8. A fishing net according to claim 7, wherein the guide is an apertured extension of the slide providing a limb around which the second element is passed.

9. A fishing net according to claim 1, wherein the outer ends of the arms are bent inwardly.

10. A fishing net according to claim 2, wherein the mounting means has an inner wall whose inner periphery is of a complementary fit for the tubular shaft handle, and an outer wall to define with the outer periphery of the inner wall, the divergent passages, the inner periphery of the outer end portions of the outer wall having inward ramps to influence the outer end portions of the arms inwardly, when retracted, whereby the outer ends substantially abut each other.

11. A fishing net according to claim 1, wherein an inner end of the handle is provided with a hand grip.

* * * * *